United States Patent
Mestha et al.

(10) Patent No.: US 8,456,720 B2
(45) Date of Patent: Jun. 4, 2013

(54) REDUCING NOISE INDUCED BY COLOR MIXING SPOT COLOR RECIPE SEARCH

(75) Inventors: Lalit Keshav Mestha, Fairport, NY (US); Alvaro Enrique Gil, Rochester, NY (US); Peter Aidan Crean, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 807 days.

(21) Appl. No.: 12/581,566

(22) Filed: Oct. 19, 2009

(65) Prior Publication Data

US 2011/0090548 A1    Apr. 21, 2011

(51) Int. Cl.
*H04N 1/46* (2006.01)
*G03F 3/08* (2006.01)

(52) U.S. Cl.
USPC ............ 358/518; 358/520; 358/522; 358/523

(58) Field of Classification Search
USPC ................ 358/518, 1.15, 1.16, 1.9, 500, 522, 358/523, 520, 517, 529, 530
See application file for complete search history.

(56) References Cited

U.S. PATENT DOCUMENTS

| | | | | |
|---|---|---|---|---|
| 7,773,252 B2 * | 8/2010 | Yoshida et al. | ................ | 358/1.9 |
| 2004/0263882 A1 * | 12/2004 | Ito et al. | ......................... | 358/1.9 |
| 2004/0264772 A1 * | 12/2004 | Une | ............................. | 382/167 |
| 2005/0047648 A1 * | 3/2005 | Newman et al. | ............... | 382/162 |
| 2005/0062779 A1 * | 3/2005 | Mimamino | ..................... | 347/15 |
| 2006/0250411 A1 * | 11/2006 | Oh | ................................. | 345/589 |
| 2008/0043263 A1 | 2/2008 | Hancock et al. | | |
| 2008/0297818 A1 * | 12/2008 | Shimbaru | ...................... | 358/1.9 |
| 2009/0002783 A1 * | 1/2009 | Hashii et al. | .................. | 358/520 |
| 2009/0161125 A1 | 6/2009 | Mestha et al. | | |
| 2009/0185230 A1 * | 7/2009 | Mestha et al. | ............... | 358/3.23 |
| 2009/0185245 A1 * | 7/2009 | Kuno | ............................ | 358/523 |
| 2009/0225340 A1 * | 9/2009 | Hatori | ........................... | 358/1.9 |
| 2010/0215258 A1 * | 8/2010 | Mestha et al. | ................ | 382/162 |
| 2011/0051208 A1 * | 3/2011 | Hirano et al. | ................ | 358/518 |

\* cited by examiner

*Primary Examiner* — Jerome Grant, II
(74) *Attorney, Agent, or Firm* — Philip E. Blair; Fleit Gibbons Gutman Bongini & Bianco P.L.

(57) ABSTRACT

What is disclosed is a novel system and method to reduce noise induced by color mixing in a color management system. At least one device color recipe is obtained for a target spot color. The recipe is defined for a color marking device and defines a range of marking device color values for a target L*a*b color value. Next, a minimal value and a maximum value of each color value in the range of color values for said target L*a*b color value are identified. An iterative process of searching is performed until the printed color test patch produces a visually acceptable smoothness while matching color accuracy. This iterative process includes generating at least one additional new device color recipe from color values within the range of color values. At least one of the new device color recipes is selected and provided to the color marking device for rendering.

16 Claims, 14 Drawing Sheets

|  | C | M | Y | K | L* | a* | b* |
|---|---|---|---|---|---|---|---|
| MIN | 125 | 132 | 0 | 0 | 57.92 | 33.20 | -16.07 |
| MAX | 172 | 182 | 70 | 97 | | | |
| MIN | 0 | 184 | 21 | 0 | 69.90 | -0.62 | 9.07 |
| MAX | 149 | 234 | 128 | 150 | | | |
| MIN | 214 | 0 | 203 | 0 | 20.14 | -10.35 | -9.59 |
| MAX | 295 | 185 | 243 | 206 | | | |

FIG. 5

REDUCING NOISE INDUCED BY COLOR MIXING SPOT COLOR RECIPE SEARCH

TECHNICAL FIELD

The present invention is related to systems and method to reduce noise induced by color mixing spot color recipe search in a color management system.

BACKGROUND

To meet customer demand, the commercial printing industry requires the capability of producing spot colors accurately and consistently. Spot colors can be defined as a fixed set of colors which may be Pantone® colors, customer logo colors, colors in a customers proprietary marked patterns, or customer defined colors in the form of an index color table. Spot colors are often used, or can be used, for large background areas, which may be the most color critical portion of a particular page. Consistent color in these areas may determine the difference between success and failure in meeting customer requirements.

Often spot colors in a multicolor printing system are rendered with a gray component replacement (GCR). The GCR allows the use of 3 or more number of separations to produce the color. For example, a tri-color GCR approach is used in Xerox iGen3 printer with Pantone® Spot Color Calibration (SCC) feature. In tri-color GCR, only three separations such as CMY, CMK, MYK, and CMK are used to produce the spot color. A search algorithm such as the Automated Spot Color Editor (ASCE) based iterations are performed on each spot color of interest in a way that guarantees both consistency and accuracy. This approach nearly always renders spot colors with either min-K or max-K solution. However, there is no intermediate-K solution being offered. Appearance of spot colors may result in non-smooth or noisy rendering because of the differences in halftone structures present in each separation. These differences in halftone structures are created by the interactions among colors as a result of varying amounts of CMYK recipe, particularly with K separation.

Accordingly, what is needed in this art are increasingly sophisticated systems and methods for reducing noise induced by color mixing spot color recipe search such that a customer can find a balanced amount of CMYK recipe that not only gives accurate color but which also appears smooth and thus less noisy.

BRIEF SUMMARY

What is disclosed is a novel system and method to improve the smoothness of spot color prints by producing spot colors with varying amounts black (or any other separations) and yet maintain the advantages (improved color accuracy and consistency) offered by iterative recipe search approach. The present method advantageously provides a range of K separations along with CMY separations to suppress the noise induced by halftone interactions and uniformity errors caused by mottle like prints, thus making them appear smooth. The present method uses an algorithm to set upper and lower limits on the choice of separation for the spot color of choice. Through an implementation hereof, the selected spot color recipe results in a best color appearance for smoothness while achieving accurate target color matching.

In one embodiment, the present method involves performing the following. At least one device color recipe for a target spot color is obtained. The device color recipe is defined for a color marking device and defines a range of marking device color values for a target L*a*b color value. A minimal value and a maximum value of each color value in the range of color values for the target L*a*b color value are identified. An iterative process of searching until the printed color test patch produces a visually acceptable smoothness while matching color accuracy of the target spot color is carried out. The iterative process includes generating at least one additional new device color recipe from color values within the range of color values. At least one of the new device color recipes is selected and provided to the color marking device for rendering. Optionally, a separation curve is defined within the range of color values. The separation curve comprises a set of discrete color values for the color marking device.

Advantageously, the present method is particularly useful in multicolor print systems, such as N-color device, where $N \geq 4$, where many recipes tend to produce the same theoretical color but differ in structure and appearance. Prints are made which sample device space to reproduce a given single color, and the user can select the color with the least spatial artifacts. The present method assists in identifying a set of samples over the full color range of all separations that create a specific L*a*b* color (in gamut).

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 5 is a table of an example range for three spot colors;

DETAILED DESCRIPTION

Figure 1:
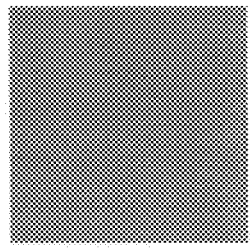
FIG. 1 is an example of the spot color for max-K solution.
Figure 1:
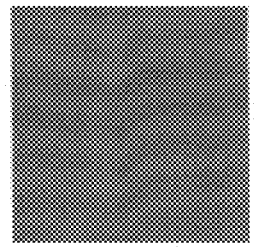
Figure 1:
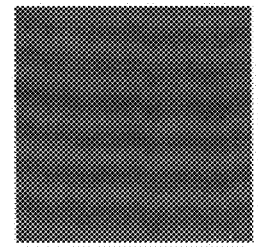
Figure 1:
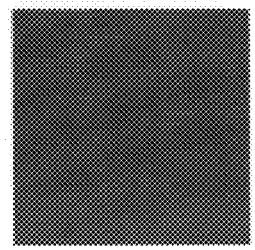
Figure 1:
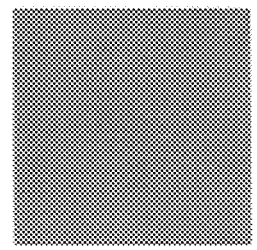
Figure 1:
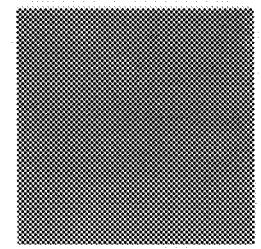

What is provided are a system and method for assisting customers to search device space for spot colors to find recipes with a least noise and a best smoothness.

It should be understood that one of ordinary skill in this art would be readily familiar with many facets of color science such as, but not limited to, color space, color gamuts, gamut mapping, and other related techniques and algorithms commonly found in the color science arts. Additionally, one of ordinary skill would also be familiar with advanced mathematical techniques used for color manipulation and various color transformation processes. Those of ordinary skill would be familiar with the text: "*Digital Color Imaging Handbook*", 1$^{st}$ Ed., CRC Press (2003), ISBN-10: 084930900-X, ISBN-13: 97808-4930-9007, and "*Control of Color Imaging Systems: Analysis and Design*", Lalit K. Mestha and Sohail A. Dianat, CRC Press (2009), ISBN-13: 97808-4933-7468, both of which are incorporated herein in their entirety by reference. One of ordinary skill would also be knowledgeable about computer science and software and programming systems and methods sufficient to implement the functionality and capabilities described in detail herein in their own hardware environments without undue experimentation.

Although various embodiments hereof are described with respect to 4-color (CMYK) separations, it should be understood that the present method is equally applicable to a color device capable of N-color separations, where N≧4. For example, if N=6 the colors may be: Cyan, Magenta, Yellow, Black, Orange, and Violet. Such embodiments are intended to fall within the scope of the appended claims.

Non-Limiting Definitions

A "color marking device" refers to a device capable of reducing a signal of an image to viewable form. The set of such devices includes printers, xerographic devices, image production and photographic equipment, monitors and other display devices, and the like. Outputting the image means communicating information about the image to a color marking device. Such communication may take the form of transmitting the image in the form of signals over a network or other communication pathway, or storing the signals to a memory or storage media for subsequent retrieval. A color marking device, such as an inkjet printer, is one example of a color marking device which produces an image from the received signal onto a substrate by the visual integration of colored inks deposited thereon.

An image is a graphic or plurality of graphics, and the like, that is represented by pixel values denoting color, intensity, etc. An image may include, for instance, a test patch using target color values generated by printing application software or a control system, or a member of a collection of images in a database with patch layout located in a preferred region of the document to make measurements by an image sensor when printed. Target color values provide image data that, when used to display the image or convert the image to a hard copy, provides an approximate representation of the image. Target color values provide the target data source to the color adjustment subsystem (330 of FIG. 3) in a manner as will be more fully described herein.

The term "gamut" refers to a complete subset of colors as defined by the spectrum of light, i.e., the distribution of light energy versus wavelength, interacting with the spectral sensitivities of the eye's light receptors and the colorants on the substrate. One of the common usages refers to the subset of colors which can be accurately represented in a given circumstance, such as within a given color space or by a certain output device. Another refers to the set of colors found within an image at a given time. In this context, digitizing a photograph, converting a digitized image to a different color space, or outputting it to a given medium using a certain output device generally alters its gamut, in the sense that some of the colors in the original are lost in the transformation process. A color transformation process translates an input color space to an output color space. In conventional color management systems, a color transformation converts each input color space to an output target color space using mathematical algorithms. The mathematical algorithms of the color profiles for a color transformation may be convolved for efficiency.

A L*a*b* color space is a color-opponent space with dimension L* for luminance and a* and b* for the color-opponent dimensions based on non-linearly compressed CIE XYZ color space coordinates. Lab color space is more often used as an informal abbreviation for the CIE 1976 L*a*b* color space (also called CIELAB), whose coordinates are given by {L*, a*, b*}. Chrominance (a) is the chrominance of a first channel. Chrominance (b) is the chrominance of a second channel. Luminance (L) is a photometric quantity which, in essence, is the effect of radiance on our eyes. Radiance is the physical quantity related to light intensity, i.e., the power of the light spreading out in some solid angle over an area. Luminance is the integration of radiance weighted with a curve, which describes how efficiently different wavelengths of light trigger visual receptors in the eye. Brightness is the subjective visual experience of luminance, i.e., the effect of luminance on the brain. Primary colors are understood to be Cyan, Magenta, Yellow, and Black. Secondary colors are understood to be Red, Green, and Blue.

"Separation curve" or "separation function" is a linear or nonlinear function between minimum to maximum value of the allowable color recipe.

Visual Overview of Spot Color Noise

Figure 2:
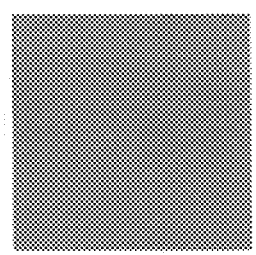
FIG. 2 is the same spot color of FIG. 1 with a min-K solution.
Figure 2:
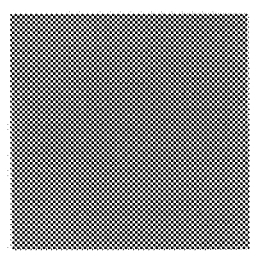
Figure 2:
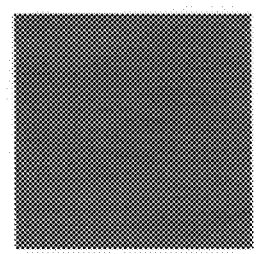
Figure 2:
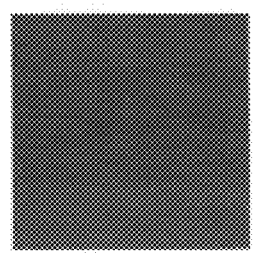
Figure 2:
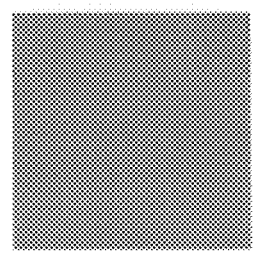
Figure 2:
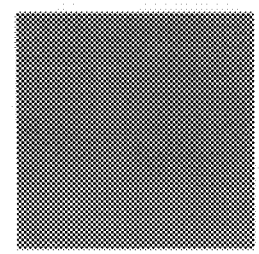

In a four color printer, there are numerous combinations of CMYK, especially for colors near the neutral axis, that can produce the same color. Degeneracy in printers is often caused by the addition of K separation. The number of combinations available to produce the same color decreases dramatically as we approach the boundary. GCRs are designed to constraint the amount of K separation to achieve improved image quality. The appearance of spot colors might result in a non-smooth rendering because of the differences in half tone structures when just min-K or max-K solutions are used. FIG. 1 is an example of the spot color for max-K solution. FIG. 2 is the same spot color of FIG. 1 with a min-K solution i.e. K close to 0. Reviewing FIGS. 1 and 2, it is clear that K=0 prints appear more smooth and with low halftone noise. This may be true in some spot colors, but for others, the addition of slight amount of black separation with the right amount of CMY (anywhere between its min to max value) can lead to improved smoothness. This is because slight addition of black with the right amount of CMY has the effects of suppressing halftone induced mottle and noise.

Example Hardware Embodiment

Figure 3:
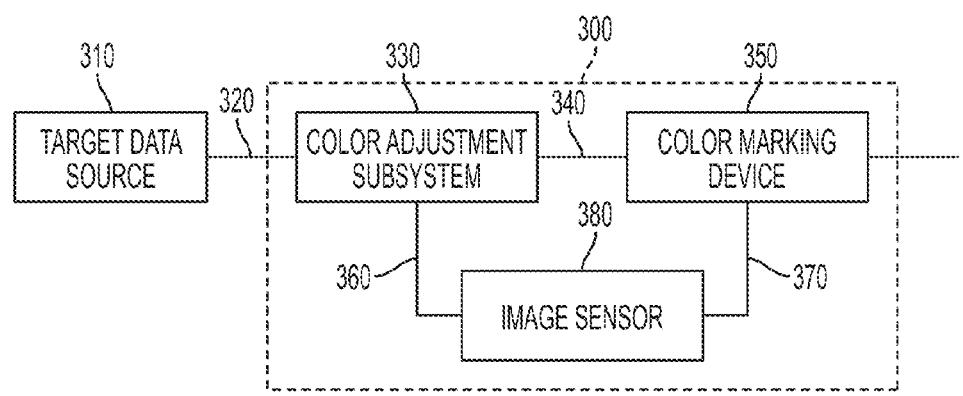
FIG. 3 illustrates an example functional block diagram of one embodiment of a print color adjustment system wherein various embodiments of the present method are likely to find their intended uses.

Reference is now being made to FIG. 3 which illustrates an example functional block diagram of one embodiment of a print color adjustment system wherein various embodiments of the present method are likely to find their intended uses. It is to be understood that certain aspects of the print color adjustment system would operate in accordance with pre-programmed instructions used to operate a local or networked computer system to carry out such features, perhaps on a plurality of interconnected computers at a time. Such a system might include a commercially available personal computer with appropriate graphics rendering capability that can also be associated with a networked storage medium or similar memory device wherein the system is accessible, perhaps via an Internet or intranet for submission of print jobs. It is also contemplated that one or more aspects of the system may be implemented on a dedicated computer workstation.

As shown in FIG. 3, color management system 300 is connected to a target data source 310, and includes color adjustment subsystem 330, an color marking device 350, and an image sensor 380. These devices are coupled together via data communication links 320, 340, 360, and 370. These links may be any type of link that permits the transmission of data, such as direct serial connections, a local area network (LAN), wide area network (WAN), an intranet, the Internet, circuit wirings, and the like. The content for a printing job is initially provided by the customer through a target data source in a form acceptable to the system. The target data source may be a personal computer, a microprocessor, a scanner, a disk drive, a tape drive, a hard disk, zip drive, CD-ROM drive, a DVD drive, a network server, a print server, a copying device, or any other known or later developed device or system that is able to provide the image data. The target data source may include a plurality of components including displays, user interfaces, memory, disk drives, and the like. For simplicity of the following disclosure, it will be assumed that the target data source is a personal computer although, as indicated above, the target data source is not limited to a personal computer.

Color marking device 350 may be any type of device that is capable of outputting a hard copy of an image and may take the form of a laser printer, a bubble jet printer, an ink jet printer, a copying machine, or any other known or later developed device or system that is able to generate an image on a recording medium using the image data or data generated from the image data. The color marking device generates the hard copy of the image based on printable image data generated by the color adjustment subsystem. Image sensor 380 may be any type of device that is capable of detecting image data from a hard copy image and supplying the image data as detected device-independent image data or post-processed image data, which may be in device-independent or in device-dependent form to the color adjustment subsystem 330. For example, the image sensor may be an optical sensor, a spectrophotometer, a color sensor, or any other known or later developed device or system that is able to measure the color values of the image data from the hard copy image output by the color marking device.

Although for the purposes of the description color management system is shown as a separate device from the target data source, the color management system may be an integrated device, such as a digital copier, a computer with a built-in printer, or any other integrated device that is capable of producing a hard copy image output. With such a configuration, for example, the target data source, the color adjustment subsystem 330, the color marking device 350, and the sensor 380 may be contained within a single device. Alternatively, the color management system may be a separate device containing the color adjustment subsystem and the sensor attachable upstream of a stand-alone color marking device. For example, the color adjustment subsystem and the sensor may be a device which interfaces with both the target data source and one or more color marking devices, as would be the case if the color management system is incorporated into a network print server that manages printer data for a plurality of the same or different printing devices. Furthermore, the color management system may be implemented as software on the color adjustment subsystem or the target data source. The image sensor 380 may be incorporated into the color marking device 350 or may exist as a stand alone device that communicates the detected data back to the target data source 310. Other configurations of the elements shown in FIG. 3 may be utilized without departing from the spirit and scope of the specification and claims herein.

Figure 4:
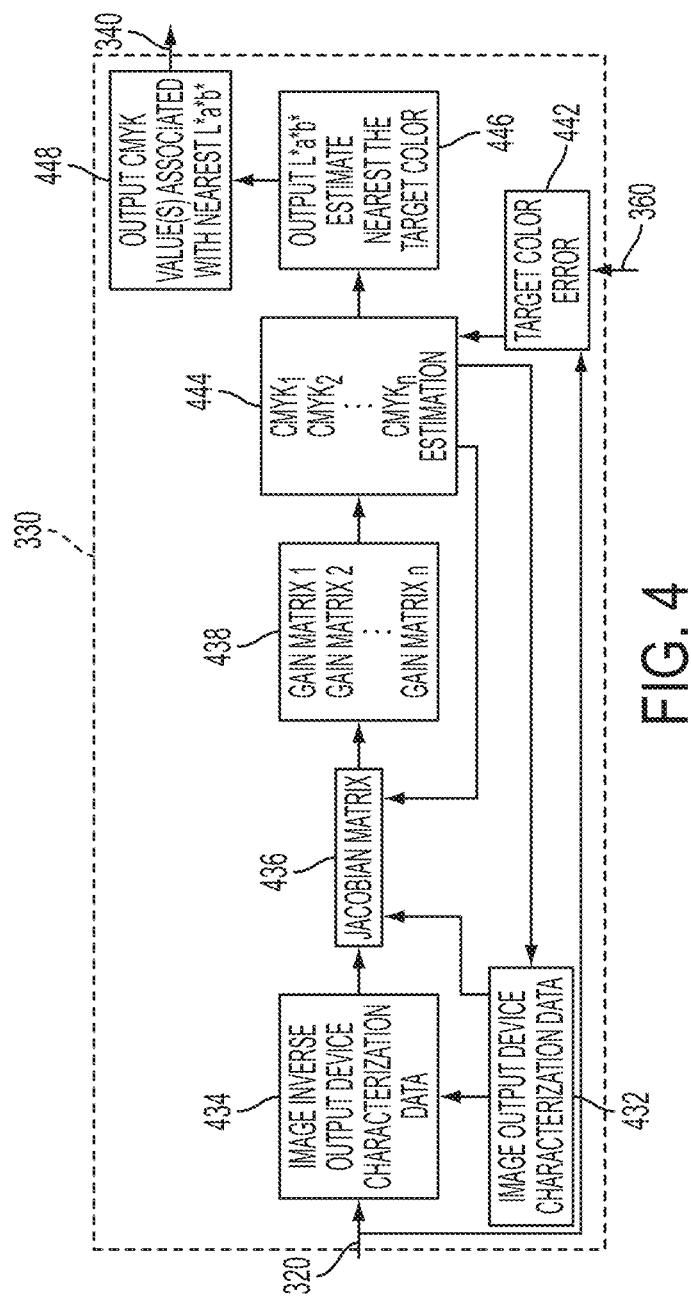
FIG. 4 is a diagram illustrating details of the example color adjustment system of FIG. 3 as a multiple input and multiple output mode.
Figure 6A:
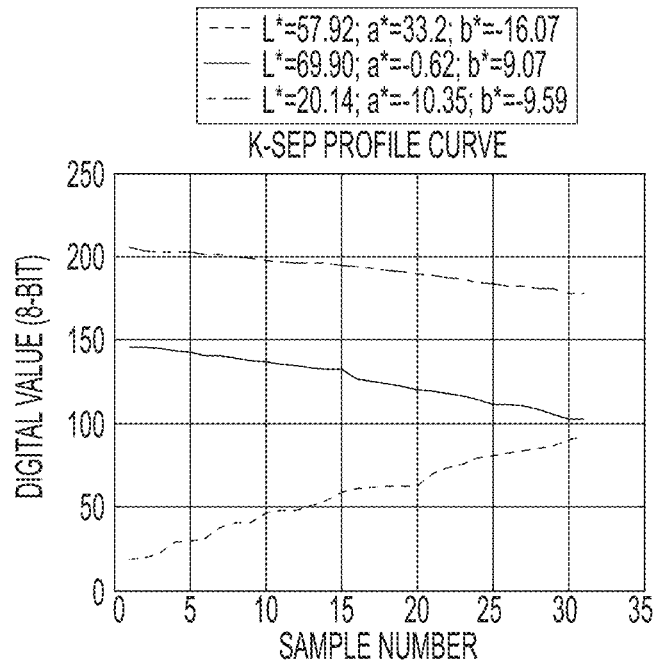
FIG. 6 is an example series of separation curves (or functions)
Figure 6B:
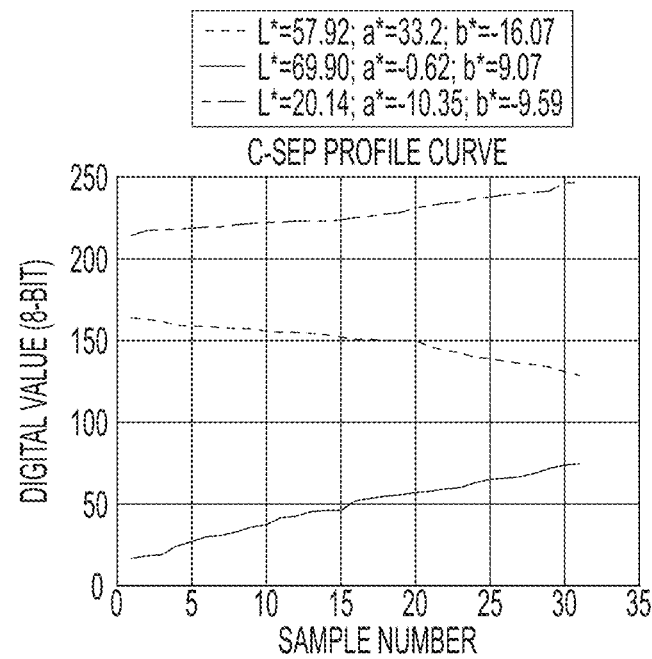
Figure 6C:
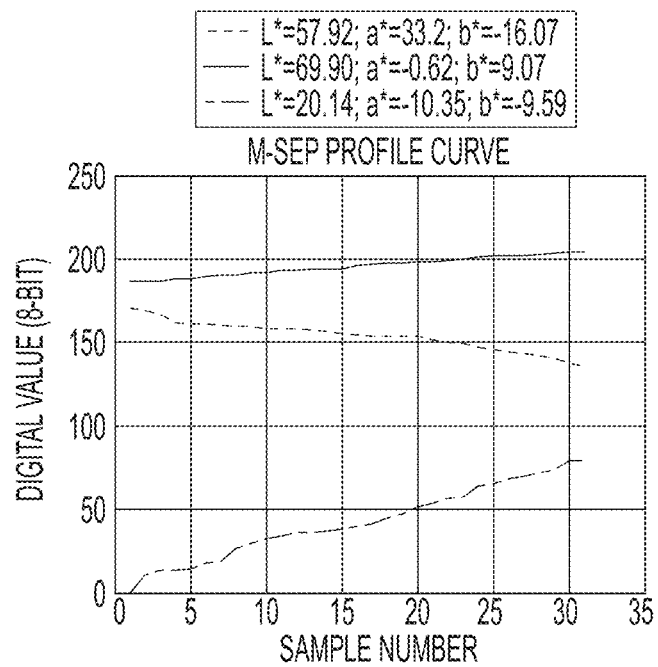
Figure 6D:
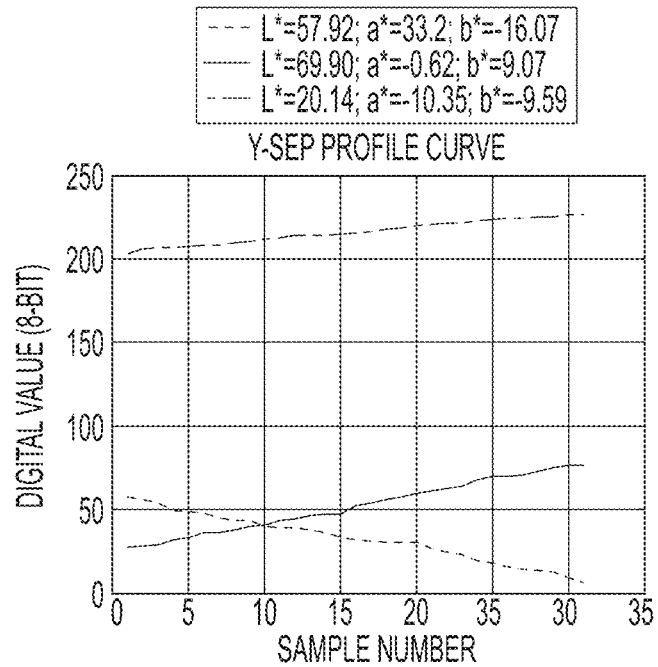

Reference is now made to FIG. 4 which is a diagram illustrating details of the color adjustment system 330 of FIG. 3 as a multiple input and multiple output model.

The spot color control system comprises data communication link 320 from the target data source 310, data communication link 340 to the color marking device 350 and data communication link 360 from the image sensor 380. The color adjustment subsystem 330 comprises color marking device characterization data 432, Jacobian matrix data 436, a plurality of gain matrices 438, CMYK estimate data matrix 444, an inverse printer output data LUT 434, a process to estimate the output $L*a*b*$ nearest the target/spot color 446, a process to output the estimated CMYK value associated with the nearest $L*a*b*$ estimate 448, and a target color error process 442 to determine the error associated with the target spot color relative to the estimated CMYK and/or measured CMYK associated with a printed output.

Noise Reduction

The present method maintains both accuracy and consistency of spot colors and at the same time provides improved smoothness by using the right amount of CMYK recipe. The recipe is obtained experimentally. The ASCE iterations can be done automatically on the printer or on the printer model. In one embodiment, the smooth spot color recipe will be found via a manual print/view process. In another embodiment, a measurement based, automatic search process is used. Any other separations (i.e., C, M, Y etc.,) can be used as variables using the teachings hereof provided that one variable is used at a time as a constraint during the course of manual iterative print/view search process. Normally, customer's who print spot colors have some predefined number of spot colors as their favorites. Hence, a manual print/view search process is considered useful to serve those type of customers who otherwise would not be able to achieve smooth spot color rendition.

The present system and method has the following major functional steps or functional areas:
1. Determination or setting of range/limits to each separations;
2. Separation function (curve) and determination of quantized values; and
3. Experimental search process to obtain optimal recipe for improved smoothness.

Each of these major areas will now be described in more detail.

1. Determination or Setting of Range/Limits to Separations

A printer model is obtained from the database or created with an updated printer model using the techniques described in Chapter 7 of the above-referenced text: "*Control of Color Imaging Systems: Analysis and Design*".

The spot color aim is examined to determine whether the spot color is inside or outside the color gamut of the printer. The color gamut is obtained from the printer model. The color aim curve defines both the definition of neutral in terms of the relationship between measured densities and the relation between common input code values and output densities. Aim values are in $L*a*b*$ space. Typically they may be user supplied $L*a*b*$ or obtained from the Pantone®, or any other spot color database. If the spot color aims are outside the printer gamut then an appropriate gamut mapping function is invoked to derive new gamut mapped L*a*b* value. For sake of brevity, it assumes that all aim values would have gone through this kind of determination and mapping first.

The example method to find potential combinations of CMYK recipe to produce that color is described below with reference to U.S. patent application Ser. No. 11/959,824, filed on Dec. 19, 2007, entitled "A Method For Classifying A Printer Gamut Into Subgamuts For Improved Spot Color Accuracy" with inventors Lalit K. Mestha, Alvaro E. Gil, Matthew Hoffmann, the teachings of which is incorporated in its entirety hereinto by reference. Maximum K solution would include use of gamut classes such as CYK, MYK and CMK for a CMYK printer. Minimum K solution would use CMY in overlapping regions where K is set to zero. Choice of these gamut classes can be used to define the range for each separation. A minimum and maximum value or range of the CMYK recipe is then stored. This will set the limits for the separations. Table 1 in FIG. 5 is an example of the range for three spot colors whose aim values are shown under columns L*, a*, and b*.

2. Separation Function (Curve) and Determination of Quantized Values

In simple terms, separation curve or separation function can be generated between minimum to maximum value of the allowable color recipe resulting from the above-described section 1. Shown in FIG. 6 is a series of separation curves or functions obtained from such calculations. In the embodiment where the separation function is a linear function, the separation curve can be divided into N equal steps. For example, for a spot color example 1 (L=57.92, a*=33.2, b*-16.07) shown in Table 1 of FIG. 5, CMY is fixed to a nominal value as obtained from the tri-color gamut class algorithm, and then divide the range of K to between 0 to 97 into 10 (or higher) equal steps. This results in a total of 11 quantized values meaning 11 experiments to try in step 3 for K separation as variable. FIG. 6 shows a typical separation function. Alternatively, yet another function can be obtained by inverting a printer model such as the Neugebauer model (Reference M. Mahy and P. Delabastita, Inversion of the Neugebauer equations, Color Research & Application, 21(6), 365-374, 1996) the teachings of which is incorporated in its entirety hereinto.

3. Searching for the Recipe with Print/View Process

In this functional area the ASCE iterations are run for each of the quantized values shown in the above-described section 2. A range of K is defined that will be combined with CMY values to determine which final value of K to use as the spot color recipe. Although the description hereof is given with respect to a black colorant, the methods disclosed are equally applicable to a search for any other colorant. For the separation curve introduced above, a nominal CMY value and j number of K values are considered. Further, the target L*a*b* value of the spot color is known. Next, feedback is applied using control laws to compute the CMYK recipe that when used will reproduce the color with certain deltaE accuracy. As described in section 1, the target L*a*b* values are assumed already mapped into the reproducible gamut of the color marking device. Techniques known in the art for mapping L*a*b* values to the reproducible gamut of the color marking device are used.

Detailed and Generalized Flows

The following is an example of the detailed steps used to reduce noise induced by color mixing in a color management system 1. Define the number of iterations to perform.

2. Start with i=1 to use the K1 value to form the recipe CMYK1, where CMY is the nominal value.
3. Print the patch with $CMYK_i$.
4. Measure the L*a*b* of patch $CMYK_i$.
5. Compute the error, e=tarL*a*b*−L*a*b* where tarL*a*b* is the target value.
6. Compute the Jacobian, $$B = \begin{bmatrix} \frac{\Delta L}{\Delta C} & \frac{\Delta L}{\Delta M} & \frac{\Delta L}{\Delta Y} \\ \frac{\Delta a}{\Delta C} & \frac{\Delta a}{\Delta M} & \frac{\Delta a}{\Delta Y} \\ \frac{\Delta b}{\Delta C} & \frac{\Delta b}{\Delta M} & \frac{\Delta b}{\Delta Y} \end{bmatrix}, \text{ where } \frac{\Delta L}{\Delta C}$$

is computed by fixing $MYK_i$, $$\frac{\Delta L}{\Delta M}$$

is computed fixing $CYK_i$ and so on.

7. Compute the gain matrix, G, via pole placement using the Jacobian B computed in 6.
8. Compute the new $CMYK_i$ by adding the previous $CMYK_i$+G*e. Note that we are only modifying the CMY values and $K_i$ remains fixed during all iterations.
9. Is current iteration greater than the number of desired iterations for the spot color? If yes, then continue the process in 10. Otherwise, increase the current iteration for $K_i$ and go to 3.
10. Is there another $K_i$ to try? If yes, i=i+1, reset the current number of iterations to 1, start again with the nominal CMY value, and go to 3. Otherwise, stop.

The above procedure is to be used with a image out device, such as printer, but can also be used with a printer model by modifying step 4, in which the estimated L*a*b* value is obtained using a printer model.

Steps 1 to 10 can be executed when $C_i$ is varied within the min and max range values. When C is fixed from the separation function (curve) best MYK recipe is obtained based on the teachings of steps 1 to 10. Initial or nominal MYK are chosen to begin the search and ASCE iterations are carried out in a similar way as above to find the best MYK. Note that corresponding changes are made to the Jacobian matrix in step 6.

For the nonlinear case, in one approach in which K is varied, the j number of CMYK values is obtained from all the available combinations. For instance, take j CMYK samples evenly spaced or randomly selected from FIG. 6. In this case, there is not a nominal CMY since there is a different CMY value for each of the j selected K values. Proceed to apply the above steps for each initial CMYK combination. Again, K is kept fixed throughout the iterations and fine tune the initial CMY value to reach the desired target L*a*b* value. In another approach in which C is varied, we follow the same process. Also C is kept fixed throughout the iterations and fine tune the initial MYK value to reach the desired target L*a*b* value. This approach continues for M and Y separations, if needed, one at a time, with appropriate changes to the initial (or nominal) separations.

Figure 7:
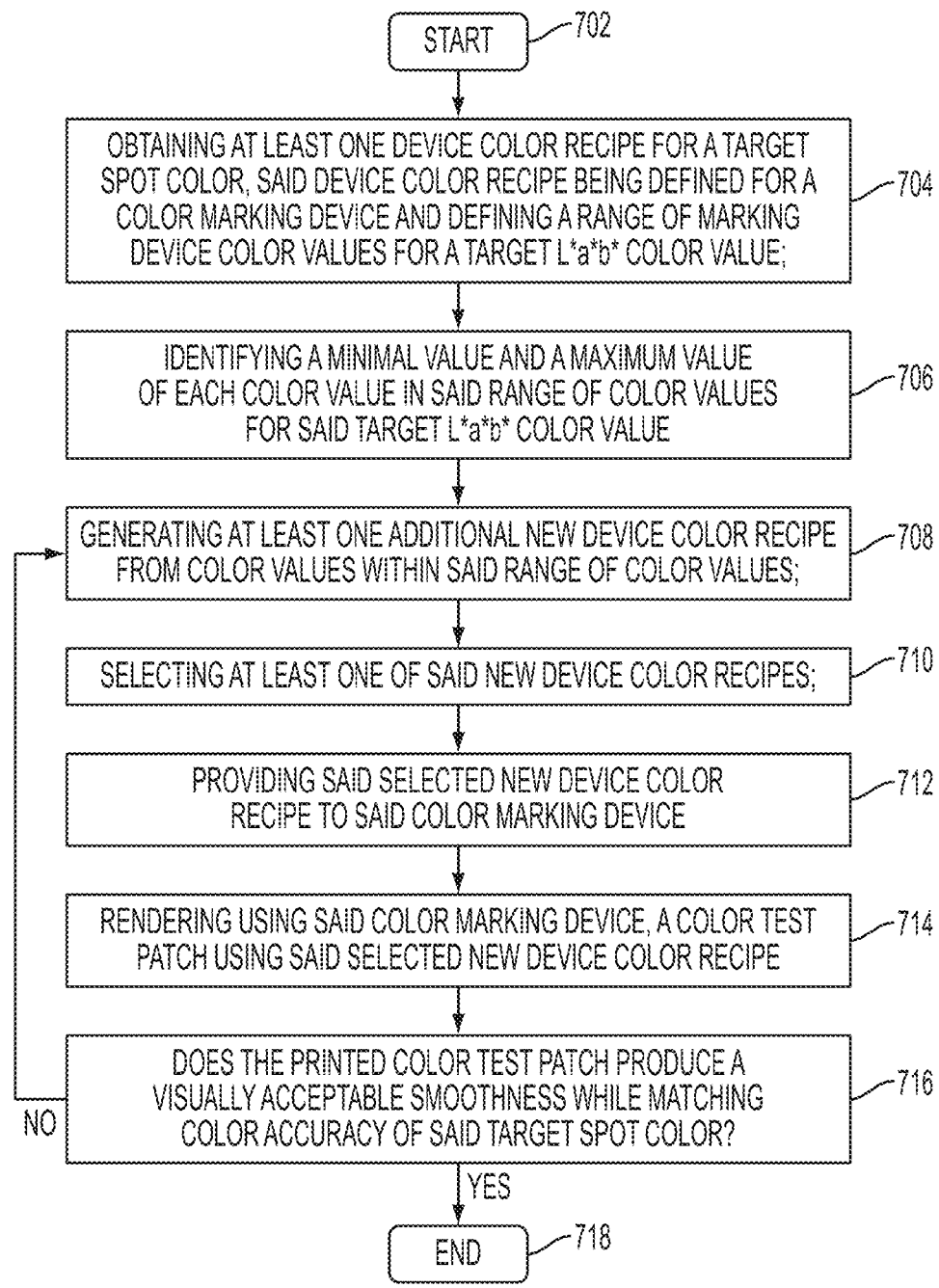
FIG. 7 is a high-level flow diagram of one example embodiment of the present method of reducing noise induced by color mixing.
Figure 8:
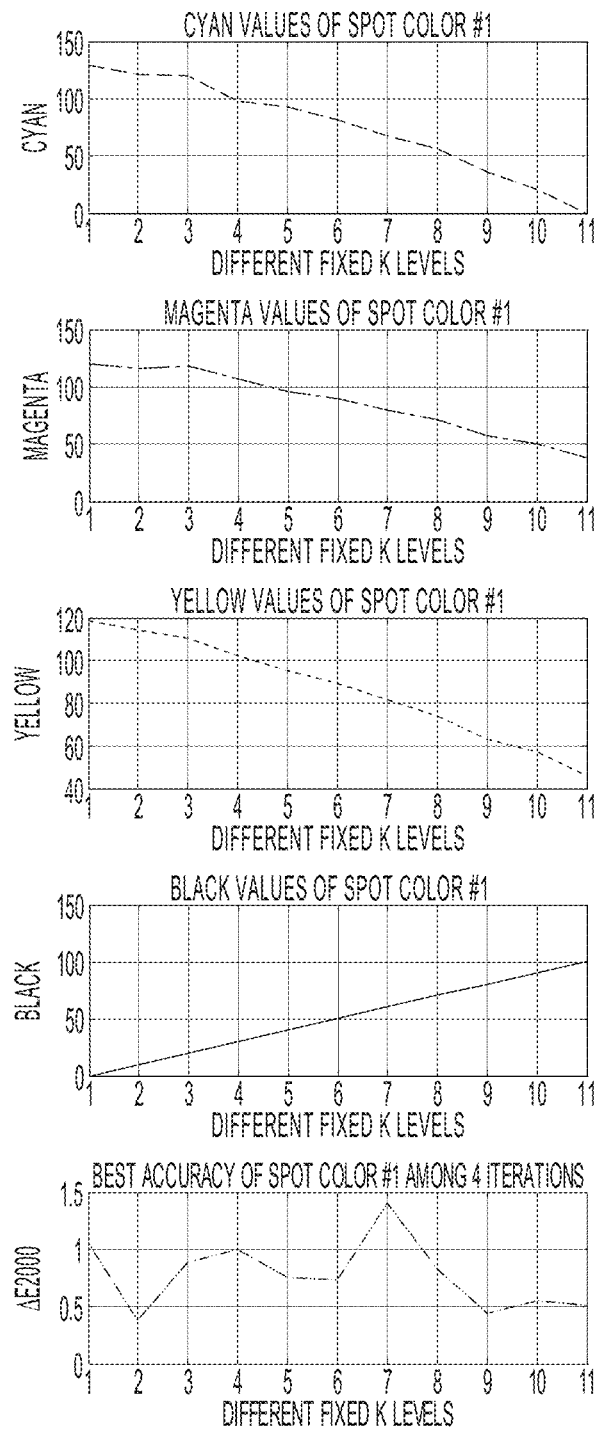
FIG. 8 are spot colors for final CMYK and deltaE2000 values (after ASCE iterations) obtained for 11 different K values for spot color 1.
Figure 9:
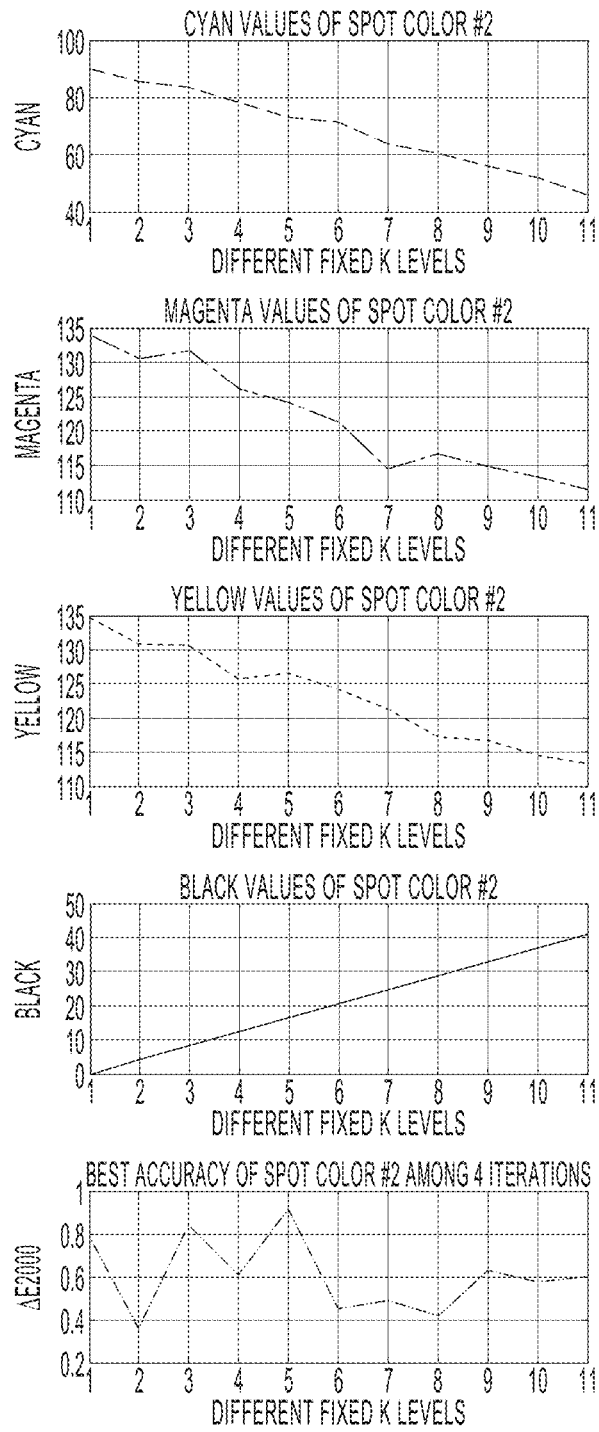
FIG. 9 are spot colors for final CMYK and deltaE2000 values (after ASCE iterations) obtained for 11 different K values for spot color 2.
Figure 10:
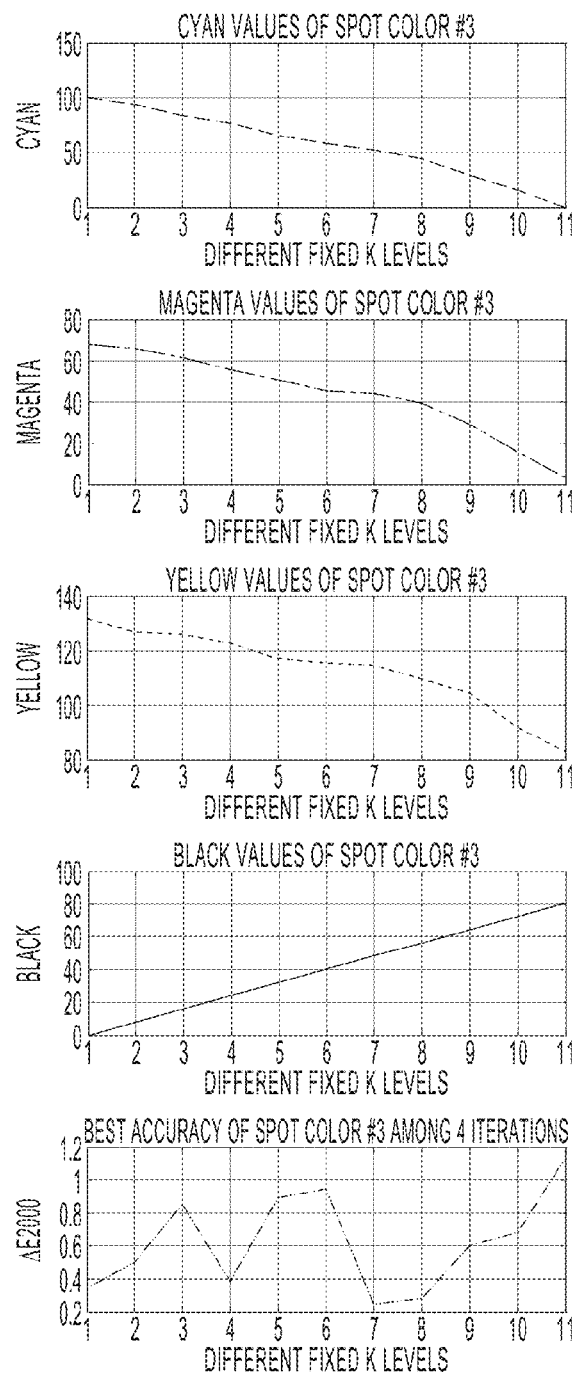
FIG. 10 are spot colors for final CMYK and deltaE2000 values (after ASCE iterations) obtained for 11 different K values for spot color 3.
Figure 11:
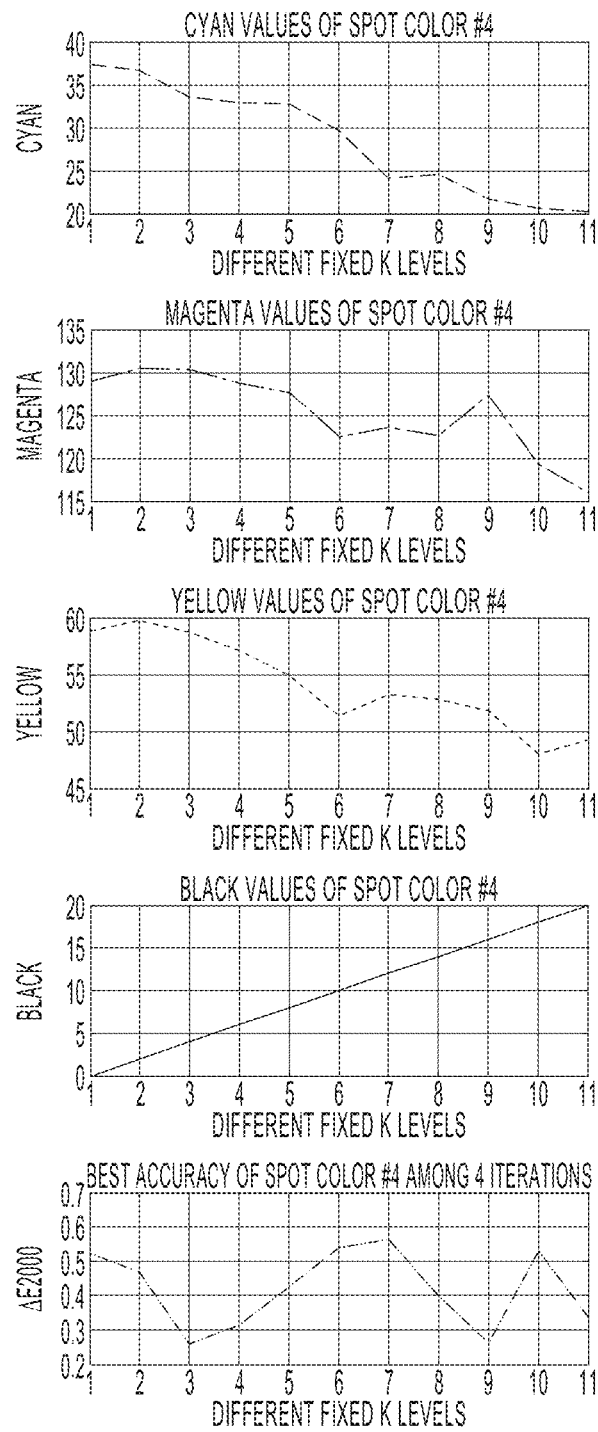
FIG. 11 are spot colors for final CMYK and deltaE2000 values (after ASCE iterations) obtained for 11 different K values for spot color 4.
Figure 12:
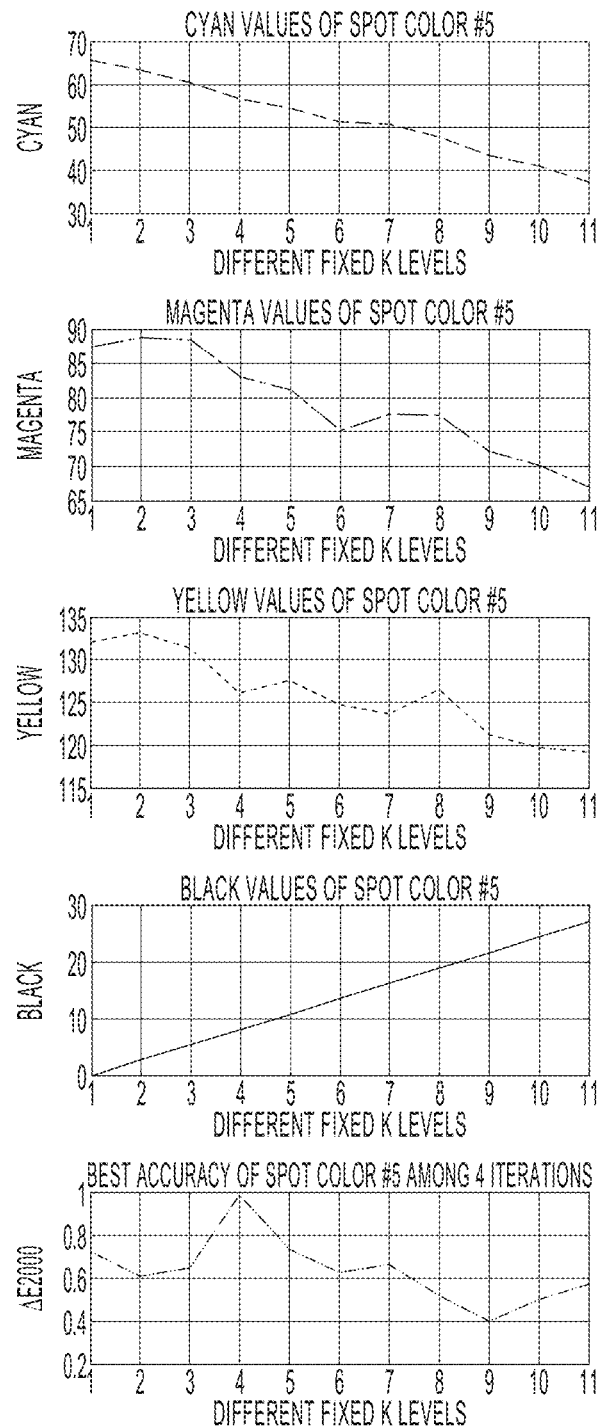
FIG. 12 are spot colors for final CMYK and deltaE2000 values (after ASCE iterations) obtained for 11 different K values for spot color 5.
Figure 13:
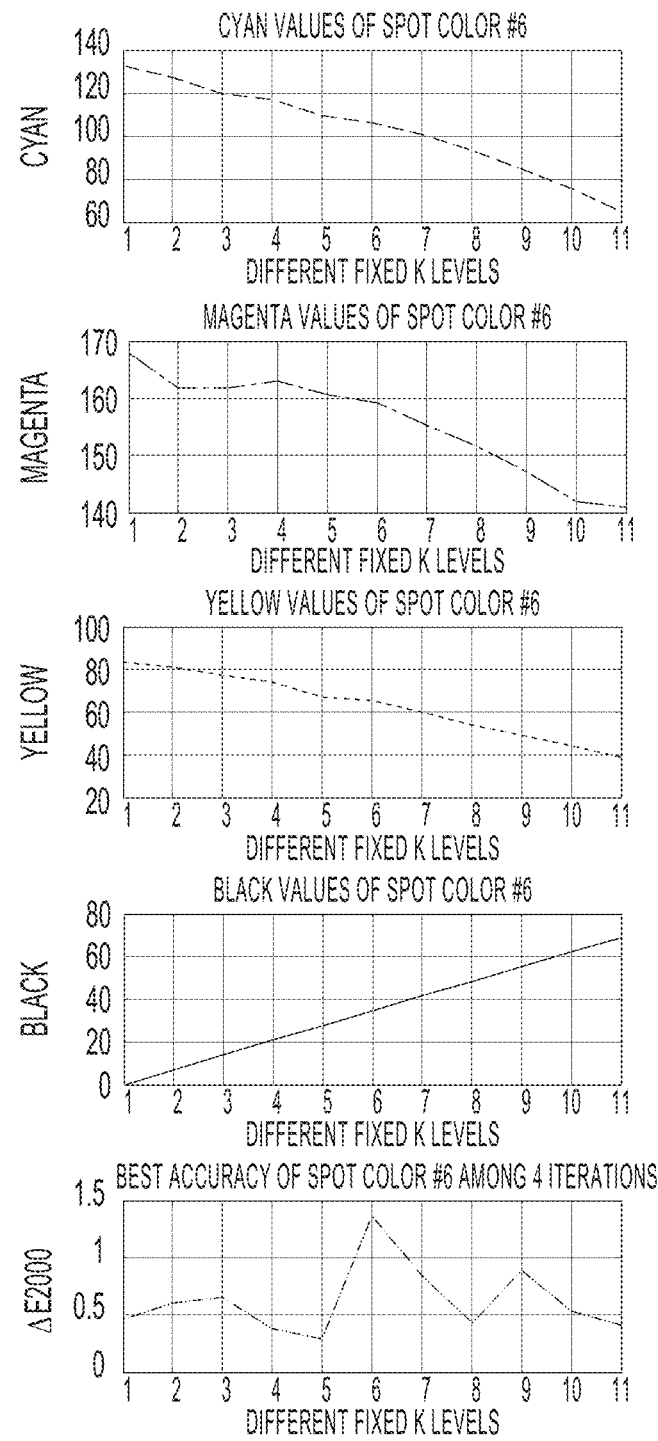
FIG. 13 are spot colors for final CMYK and deltaE2000 values (after ASCE iterations) obtained for 11 different K values for spot color 6.

Referring to FIG. 7, shown is a high-level flow diagram of one example embodiment of the present method of reducing noise induced by color mixing.

The method begins in step 702 and immediately proceeds to step 704 in which at least one device color recipe for a target spot color is obtained. The device color recipe is defined for a color marking device and defining a range of marking device color values for a target L*a*b color value. Next, a minimal value and a maximum value of each color value in the range of color values for said target L*a*b color value are identified in step 706. Next steps 708-716 is an iterative process of searching until the printed color test patch produces a visually acceptable smoothness while matching color accuracy of said target spot color is carried out. This iterative process includes generating at least one additional new device color recipe from color values within said range of color values in step 708. At least one of the new device color recipes is selected and provided to the color marking device for rendering in step 710. For example, in one embodiment, the non-linear function holds any three color separations to a fixed value while varying a fourth separation. Once a visually acceptable smoothness while matching color accuracy of said target spot color is achieved the flow completes in step 718.

The following is provided to review the effects of K on 6 different spot colors. All these spot colors were inside the Xerox iGen3 gamut. A Xerox iGen3 with the XIG ILS to measure the L*a*b* values of the printed spot colors was used. The target L*a*b* values of the spot colors were obtained from a hardcopy print.

They are:
L*a*b*=[62.27 5.53 9.96] (Top right in FIGS. 1 and 2)
L*a*b*=[65.11 15.24 22.28] (Bottom right in FIGS. 1 and 2)
L*a*b*=[72.31 −3.48 27.84] (Top middle in FIGS. 1 and 2)
L*a*b*=[72.02 28.18 4.94] (Bottom middle in FIGS. 1 and 2)
L*a*b*=[74.27 6.62 32.88] (Top left in Figures FIGS. 1 and 2)
L*a*b*=[53.93 24.61 −8.35] (Bottom left in FIGS. 1 and 2)

Using an ASCE approach with the printer was iterated four times, 11 different values of K with a range for each spot color were selected as follows:
0<=K<=100.6 for spot 1.
0<=K<=41 for spot 2.
0<=K<=80.6 for spot 3.
0<=K<=20 for spot 4.
0<=K<=27 for spot 5.
0<=K<=69 for spot 6.

FIGS. 8-13 show the CMYK and deltaE2000 values obtained for spot colors 1 to 6 respectively. Notice that, in this validation test, K increases linearly since 11 K values with a linear function between minimum and maximum value were selected. The CMY values are modified to get the best possible accuracy with respect to the target values. deltaE2000 curve shows the accuracy numbers at the end of each ASCE session. As can be seen the inventors discovered, even while maintaining very good color accuracy how remarkably the smoothness appearance differs in each K level for each spot color. Also, in some cases the difference in color appearance is noticeable.

Experiments have been conducted and promising results shown for 11 different K levels (with FIG. 2 representing K=0 and FIG. 1 representing K=max). For these prints, our measurement process resulted in all spot colors being more uniform and less noisy for K=0 GCR (i.e., with visually most acceptable smoothness). However, print/view process selected colors with some K (i.e., K levels between 0 to 6 (or FIG. 2). As expected print/view process also includes preference judgment, which is yet another factor considered useful in making final determination on the right GCR.

Non-Limiting Examples

The methods hereof may be partially or fully implemented in software using object or object-oriented software development environments that provide portable source code that can be used on a variety of computer, workstation, server, network, or other hardware platforms. For example, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. One or more of the capabilities hereof can be emulated in a virtual environment as provided by an operating system, specialized programs, or from a server. It should be understood that the teachings hereof can be implemented in hardware or software using any known or later developed systems, structures, devices, and/or software by those skilled in the applicable art without undue experimentation from the functional description provided herein with a general knowledge of the relevant arts.

Figure 14:
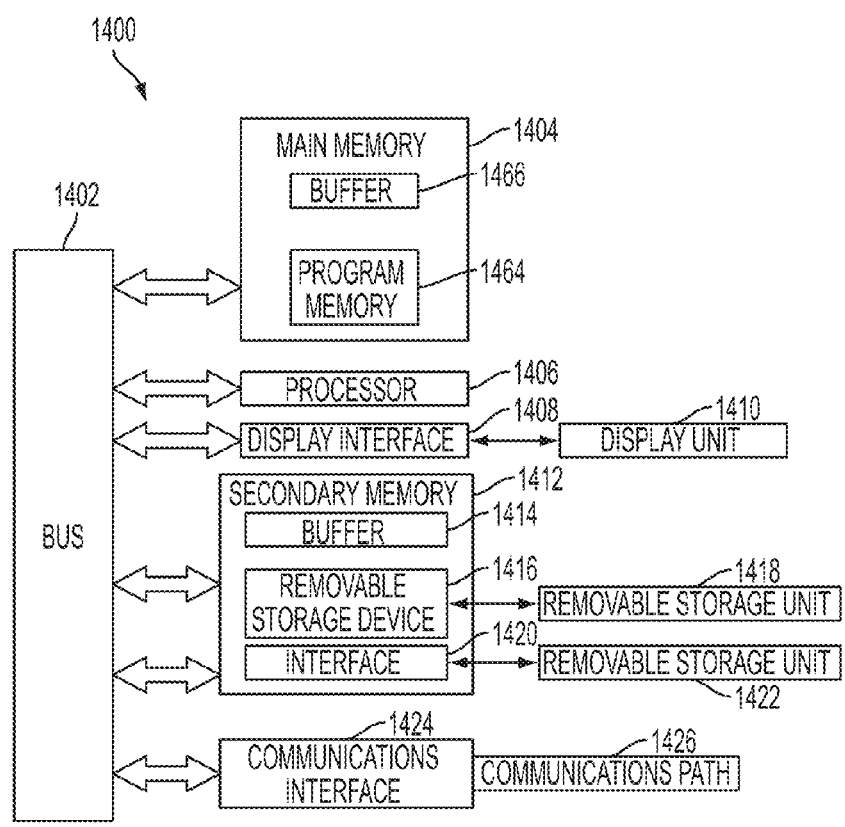
FIG. 14 illustrates a block diagram of one example embodiment of a special purpose computer system useful for implementing one or more aspects of the present method.

Reference is now being made to FIG. 14 which illustrates a block diagram of one example embodiment of a special purpose computer system useful for implementing one or more aspects of the present method. Such a special purpose processor is capable of executing machine executable program instructions. The special purpose processor may comprise any of a micro-processor or micro-controller, an ASIC, an electronic circuit, or special purpose computer. Such a computer can be integrated, in whole or in part, with a xerographic system or a color management or image processing software or system, which includes a processor capable of executing machine readable program instructions for carrying out one or more aspects of the present method. All or portions of the diagrams of the present method, as illustrated herein, may be implemented partially or fully in hardware in conjunction with machine executable instructions in communication with various components of such a system. The nature of the exact implementation will depend on the image processing environment wherein the present method finds its intended uses.

Special purpose computer system 1400 includes processor 1406 for executing machine executable program instructions for carrying out all or some of the various aspects of the present method. The processor is in communication with bus 1402. The system includes main memory 1404 for storing machine readable instructions. Main memory may comprise random access memory (RAM) to support reprogramming and flexible data storage. Buffer 1466 stores data addressable by the processor. Program memory 1464 stores program instructions. A display interface 1408 forwards data from bus 1402 to display 1410. Secondary memory 1412 includes a hard disk 1414 and storage device 1416 capable of reading/writing to removable storage unit 1418, such as a floppy disk, magnetic tape, optical disk, etc. Secondary memory 1412 further includes other mechanisms for allowing programs or other machine executable instructions to be loaded into the processor. Such mechanisms may include, for example, a storage unit 1422 adapted to exchange data through interface 1420 which enables the transfer of software and data to the processor. The system includes a communications interface 1424 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 1426 which carries such signals and may be implemented using wire, cable, fiber optic, phone line, cellular link, RF, memory, or other means known in the arts.

Terms such as, computer program medium, computer executable medium, computer usable medium, and computer readable medium, are used herein to broadly refer to media such as main memory and secondary memory, removable storage drive, a hard disk installed in a hard disk drive, and signals. These computer program products are means for providing instructions and/or data to the computer system. The computer readable medium is further capable of storing data, machine instructions, message packets, or other machine readable information, and may include non-volatile memory, such as a floppy, ROM, flash memory, disk memory, CD-ROM, and other permanent storage useful, for example, for transporting information, such as data and computer instructions. A computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs (also called computer control logic) may be stored in main memory and/or secondary memory. Computer programs may also be received via the communications interface. Such computer programs, when executed, enable the computer system to perform one or more aspects and other features and capabilities of the present methods as provided herein.

One or more aspects of the methods described herein are intended to be incorporated in an article of manufacture, including one or more computer program products, having computer usable or machine readable media. The article of manufacture may be included on at least one storage device readable by machine architectures or other xerographic or image processing systems embodying executable program instructions capable of performing one or more aspects of the present method, as described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. For purposes hereof, a computer usable or machine readable media containing machine readable instructions, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The article of manufacture may be included on at least one storage device readable by a machine architecture or other xerographic or image processing system embodying executable program instructions capable of performing the methodology described in the flow diagrams. The article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for identifying a set of target spot colors over a color range to create a target L*a*b color value, the method comprising:

obtaining for a color marking device at least one color recipe for a target spot color, and defining a range of color values of the color marking device for a target L*a*b color value;

identifying a minimal value and a maximum value of each color value in the range of color values for the target L*a*b color value; and performing each of the following steps
- a) generating, as one of a set of new color recipes, at least one additional color recipe from within the range of color values;
- b) selecting at least one of the set of new color recipes, wherein the selecting is performed either by a user or by a search algorithm;
- c) providing the selected new color recipe to the color marking device; and
- d) rendering, using the color marking device, a color test patch using the selected new color recipe;

repeating each of the steps a thru d until the rendered color test patch produces a visually acceptable smoothness while matching color accuracy of the target spot color, wherein the selecting is performed either by the user or by the search algorithm.

2. The method of claim 1, further comprising determining whether any of the range of color values correspond to a color gamut of the color marking device and, in response the determination, mapping discrete color values which do not correspond to the color gamut to color values that correspond to the color gamut.

3. The method of claim 1, further comprising forming a separation curve within the range of color values, the separation curve comprising a set of discrete color values for the color marking device.

4. The method of claim 3, wherein the separation curve is a non-linear function formed using an algorithm that inverts a printer model computing all color marking device recipes that match the target spot color.

5. The method of claim 4, wherein the non-linear function holds any three color separations to a fixed value while varying a fourth separation.

6. The method of claim 3, wherein the separation curve is formed with a linear function wherein the range of color values are equally spaced relative to each other between the minimal value and the maximal value, the separation curve using the linear function while holding CMY color separations to a value derived from a printer gamut.

7. The method of claim 1, further comprising:
measuring a last set of color values of the rendered color test patch;
creating a Jacobian matrix using the last set of color values;
computing a gain matrix using the last set of color values; and
computing an error value between the last set of values and color values of the target spot color, wherein the at least one additional color recipe is generated using a feedback controller.

8. The method of claim 7, wherein the gain matrix is computed via pole placement using the Jacobian matrix and wherein only CMY values of a new CMYK recipe are modified while K remains fixed.

9. A system for identifying a set of target spot colors over a color range to create a target L*a*b color value comprising:
a memory;
a storage medium for storing data; and
a processor in communication with the memory and the storage medium, the processor executing machine readable instructions for performing:
- obtaining for a color marking device at least one color recipe for a target spot color, and defining a range of color values of the color marking device for a target L*a*b color value;
- identifying a minimal value and a maximum value of each color value in the range of color values for the target L*a*b color value; and
- performing each of the following steps
  - a) generating, as one of a set of new color recipes, at least one additional color recipe from within the range of color values;
  - b) selecting at least one of the set of new color recipes, wherein the selecting is performed either by a user or by a search algorithm;
  - c) providing the selected new color recipe to the color marking device; and
  - d) rendering, using the color marking device, a color test patch using the selected new color recipe;
  - e) rendering, using the color marking device, a color test patch using the selected new color recipe;

repeating each of the steps a thru e until the rendered color test patch produces a visually acceptable smoothness while matching color accuracy of the target spot color, wherein the selecting is performed either by the user or by the search algorithm.

10. The system of claim 9, further comprising determining whether any of the range of color values correspond to a color gamut of the color marking device and, in response the determination, mapping discrete color values which do not correspond to the color gamut to color values that correspond to the color gamut.

11. The system of claim 9, further comprising forming a separation curve within the range of color values, the separation curve comprising a set of discrete color values for the color marking device.

12. The system of claim 11, wherein the separation curve is a non-linear function formed using an algorithm that inverts a printer model computing all color marking device recipes that match the target spot color.

13. The system of claim 12, wherein the non-linear function holds any three color separations to a fixed value while varying a fourth separation.

14. The system of claim 11, wherein the separation curve is formed with a linear function wherein the range of color values are equally spaced relative to each other between the minimal value and the maximal value, the separation curve using the linear function while holding CMY color separations to a value derived from printer a gamut.

15. The system of claim 9, further comprising:
measuring a last set of color values of the rendered color test patch;
creating a Jacobian matrix using the last set of color values;
computing a gain matrix using the last set of color values; and
computing an error value between the last set of values and color values of the target spot color, wherein the at least one additional color recipe is generated using a feedback controller.

16. The system of claim 15, wherein the gain matrix is computed via pole placement using the Jacobian matrix and wherein only CMY values of a new CMYK recipe are modified while K remains fixed.

* * * * *